July 8, 1958 M. A. HILL 2,842,298
HOSIERY BOARDING AND FORM INSERTING APPARATUS
Filed Sept. 25, 1956 4 Sheets-Sheet 3

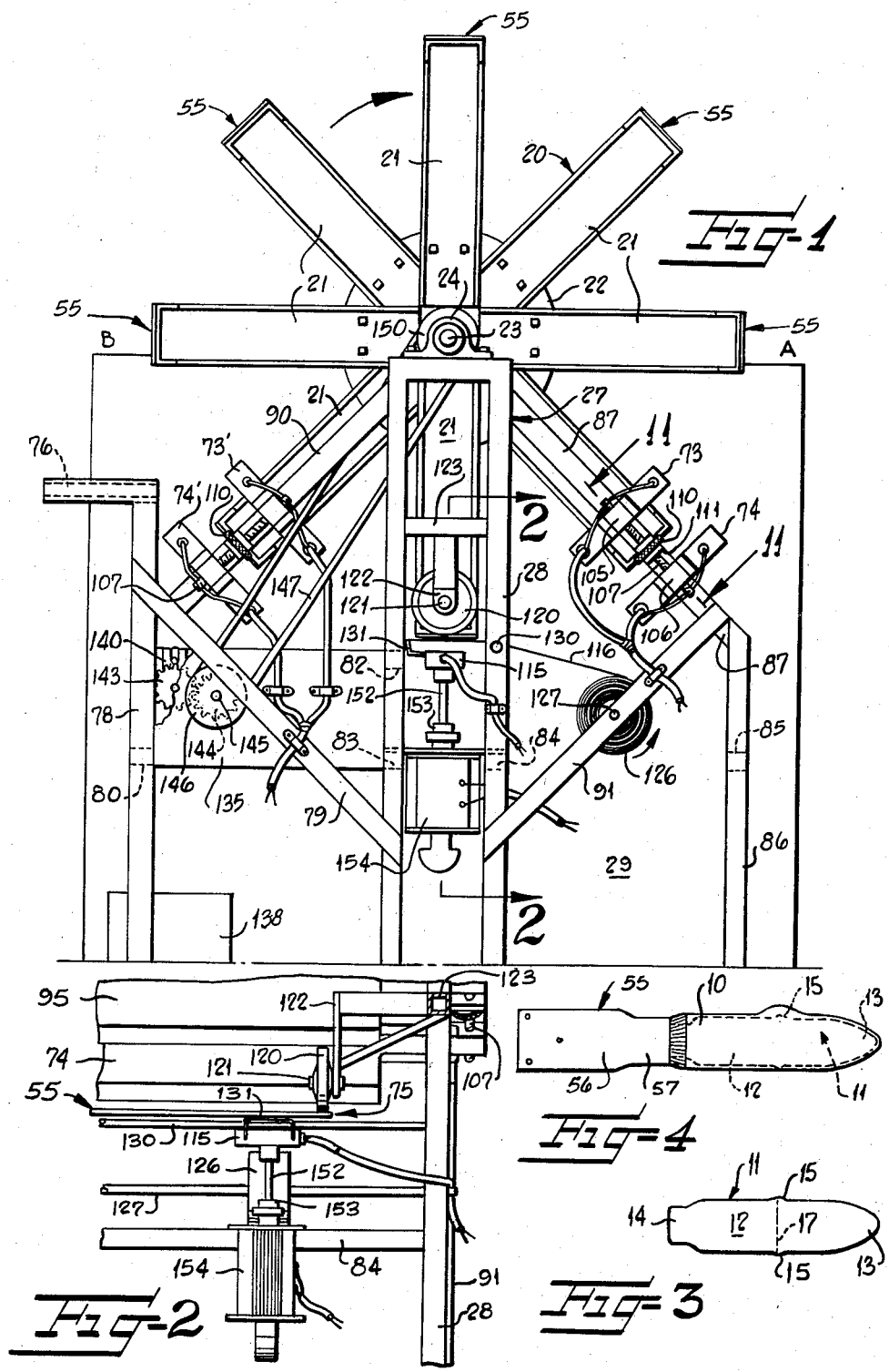

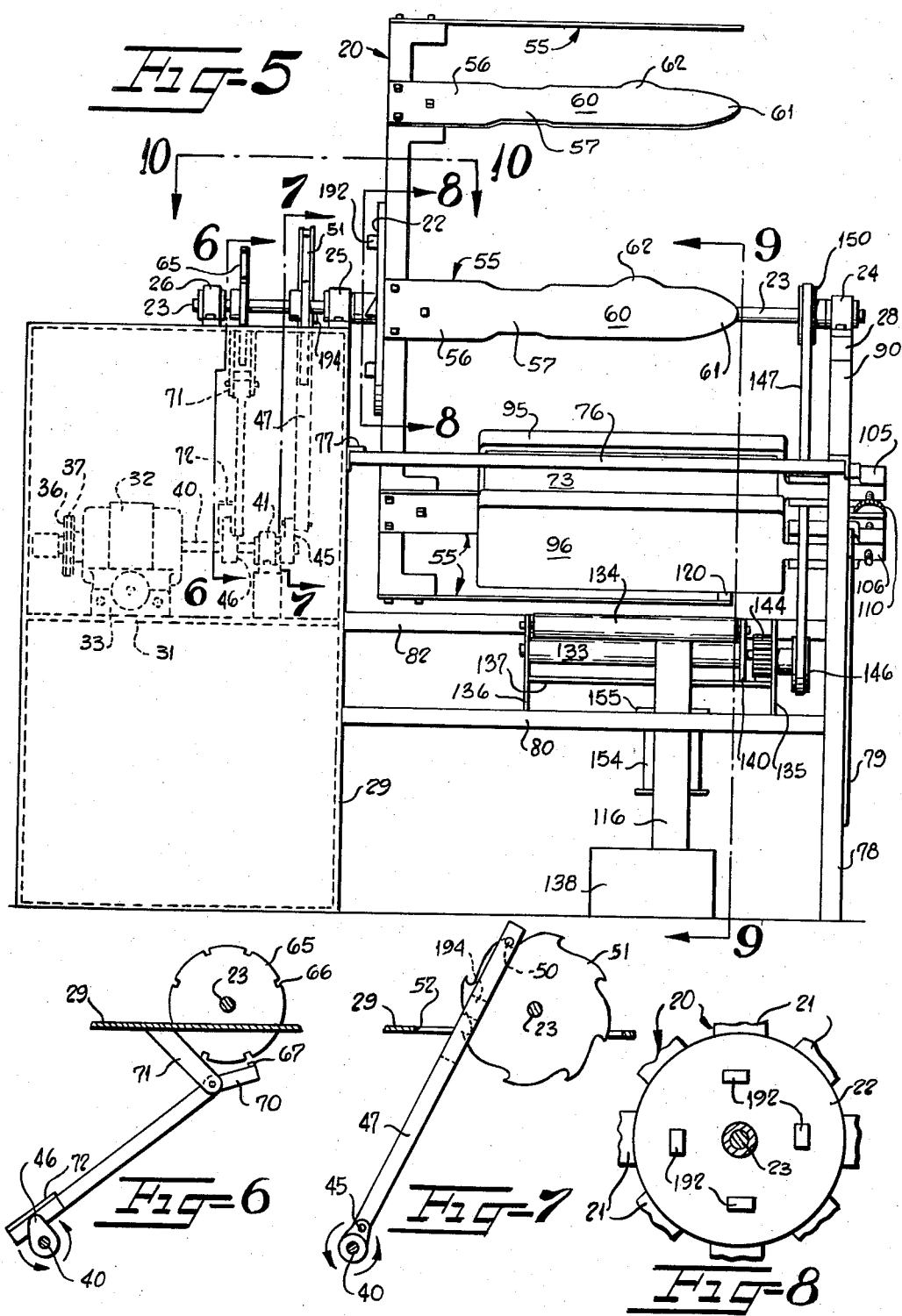

INVENTOR:
MURPHY A. HILL.
BY Eaton, Bell, Hunt + Seltzer
ATTORNEYS

July 8, 1958  M. A. HILL  2,842,298
HOSIERY BOARDING AND FORM INSERTING APPARATUS
Filed Sept. 25, 1956  4 Sheets-Sheet 4
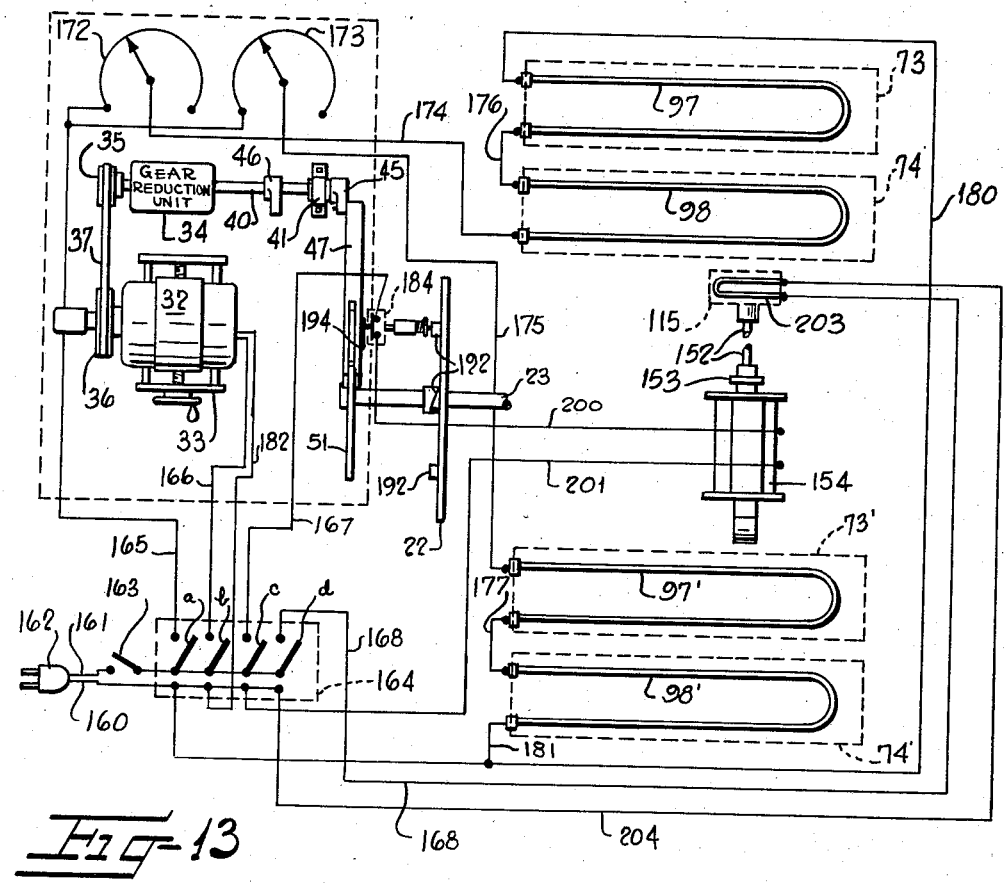
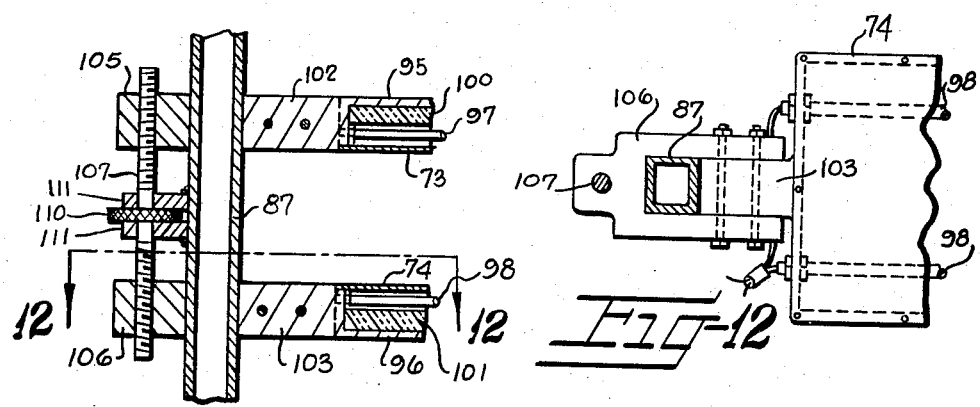
INVENTOR:
MURPHY A. HILL.
BY Eaton, Bell, Hunt + Seltzer
ATTORNEYS

United States Patent Office 2,842,298
Patented July 8, 1958

2,842,298
HOSIERY BOARDING AND FORM INSERTING APPARATUS

Murphy A. Hill, Kings Mountain, N. C., assignor to Mauney Hosiery Mills, Inc., Kings Mountain, N. C., a corporation of North Carolina Application September 25, 1956, Serial No. 611,903

14 Claims. (Cl. 223—60)

This invention generally relates to an apparatus for boarding knitted articles and, in particular, to apparatus for preparing half-hose or socks for examination and purchase by the public.

Heretofore, after socks have been dyed, washed and dried, they have been prepared for marketing by positioning each sock on a dry form which was either heated by steam or electricity or which was subsequently passed through a heated chamber or between heated members so that each sock was subjected to heat while on the forms for a sufficient period of time to insure that the sock was shaped or "boarded" properly. The socks were then removed from the forms and stacked by the operator and, in the production of so-called "stretch" hosiery, in particular, such stacks of socks were then carried to another operator who would place the two socks of each pair on separate rigid plates which would place each sock under slight tension.

Thereafter, a thin, flat and elongated strip insert made from cardboard, chipboard or related paper type material, was inserted in one of the socks of the pair while the latter sock was on the corresponding rigid plate and the insert with the sock thereon would then be slid off of the first plate and inserted in the sock on the second plate to result in a pair of socks being positioned on the strip insert. Thereafter, pairs of socks on corresponding inserts were carried to another operator who would place each pair of socks on a table and pull a strip of tape having decalcomanias or transfers thereon across each pair of socks and would select a heated iron from a heated platform which heated said heated iron and press the tape against the socks to cause the transfer to be applied to the corresponding pair of socks. It is thus seen that the prior method of preparing socks for marketing has been costly and time-consuming and has required that the socks be handled repeatedly in order to prepare them for examination and purchase by the public.

It is therefore an object of this invention to provide apparatus which will minimize the handling of socks and reduce the time and cost involved in finally boarding socks, pairing the socks, positioning inserts in the socks and applying indicia or transfers to the socks as compared to prior processes.

To these ends, I have provided an apparatus in the form of a rotary boarder comprising a spider-like wheel mounted on a substantially horizontal axis and having a plurality of circularly spaced rigid forms extending outwardly therefrom in substantially parallel relation to the axis of the wheel, each of the forms being made from a relatively thin rigid material of the configuration desired of the boarded socks whereby an operator at one side of the machine may insert a sock on each successive form as the wheel is intermittently rotated. Each successive form with the sock thereon then passes between a pair of heated members extending in substantially parallel relation to the axis of the wheel, and thereafter, each successive form with a sock thereon passes through a transfer-applying station past which a strip having transfers thereon is moved in timed relation to the movement of the wheel.

In the interim between alternate successive movements of the wheel, a heated iron automatically engages and presses the strip against the sock on alternate forms, and each successive form with a sock thereon then passes between another pair of spaced heated members or platens and subsequently occupies a position opposite from the position in which the first operator placed the sock on the form. Thereafter, a second operator positions an insert of the character described in the unmarked socks and then positions the insert with a sock thereon within the next succeeding marked sock so that all these operations are integrated.

Some of the objects of the invention having been stated, other objects will appear as the description proceeds when taken in connection with the accompanying drawings, in which—

Figure 1 is a front elevation of the improved apparatus;

Figure 2 is a fragmentary vertical sectional view taken substantially along line 2—2 in Figure 1;

Figure 3 is an elevation of one of the thin, flat and elongated strip inserts on which pairs of socks are positioned by means of the present apparatus;

Figure 4 is an elevation of one of the blades or sock forms removed from the present machine;

Figure 5 is an elevation looking at the left-hand side of Figure 1;

Figure 6 is a somewhat schematic vertical sectional view taken substantially along line 6—6 in Figure 5;

Figure 7 is a somewhat schematic vertical sectional view taken substantially along line 7—7 in Figure 5;

Figure 8 is a fragmentary vertical sectional view taken substantially along line 8—8 in Figure 5;

Figure 11 is an enlarged fragmentary sectional plan view taken substantially along line 11—11 in Figure 1;

Figure 12 is a fragmentary vertical sectional view taken substantially along line 12—12 in Figure 11;

Figure 13 is a schematic wiring diagram showing the electrical circuit of the improved apparatus.

Figure 9:
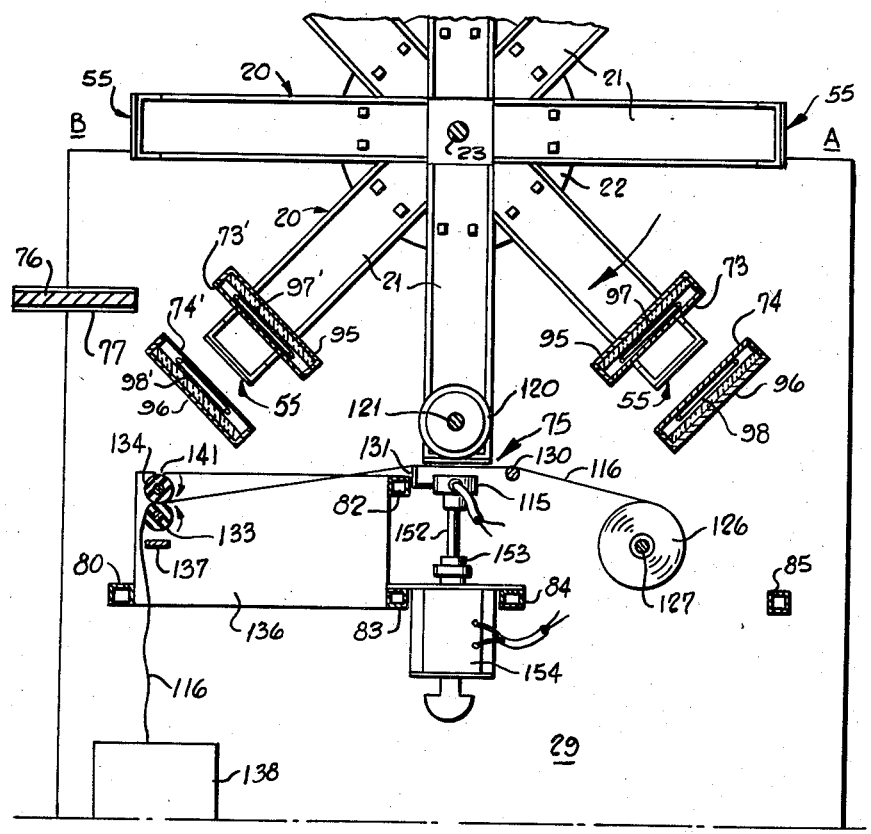
Figure 9 is a transverse vertical sectional view taken substantially along line 9—9 in Figure 5.

The present machine is particularly devised for supporting socks such as are shown in Figure 4 and indicated at 10. The particular form of sock illustrated exemplifies any of many different types of hosiery such as men's, women's, and children's socks and stockings of the type known as ankle socks, as well as socks which extend part way up on the calf of the wearer, and particularly refers to stockings made from cotton, rayon, synthetic yarn, so-called "stretch" yarn, and the like.

A typical insert which may be used with the present apparatus for maintaining socks in a slightly tensioned state is shown in Figure 3 of the drawings broadly designated at 11. The insert 11 may be made from a thin plastic material, chipboard, cardboard or a related paper-type material and includes an elongated body 12 shaped to conform to the usual stocking. The insert 11 is preferably approximately 1/16 of an inch thick and is provided with a rounded toe portion 13 at one end thereof, a flat-ended, relatively narrow or reduced welt portion 14 at the other end, and a pair of opposed relatively small rounded projections or heel portions 15 on opposite side edges of a medial portion thereof. A crease line 17 is preferably provided on the body 12 which connects the projections 15 to facilitate folding the insert after a pair of socks has been positioned thereon.

The improved hosiery boarding and form inserting apparatus, comprises an intermittently rotatable wheel or turret broadly designated at 20. The turret is mounted on a substantially horizontal axis and is shown as being of generally spider-like form. The wheel 20 comprises a plurality of radially extending arms 21 all of which are fixed to a common plate or disc 22. The plate 22 is fixed on a substantially horizontally disposed shaft 23 journaled in bearing blocks 24, 25, 26 carried by a frame broadly designated at 27.

A frame 27 comprises an inverted substantially U-shaped front-end frame member 28 and a box-like housing or rear frame member 29. The box-like housing 29 contains a substantially horizontal platform 31 on which a suitable motive means may be mounted, such motive means being shown in the form of an electric motor 32 preferably connected with the platform 31 by means of a belt tensioning, motor adjusting device generally designated at 33.

Since the motor adjusting device 33 is of well known construction and its use is well known in the art, a detailed illustration and subscription thereof is deemed unnecessary. The platform 31 also supports a gear reduction unit 34 whose input shaft has a pulley 35 fixed thereon which is connected with an adjustable or variable-speed pulley 36 fixed on the shaft of the electric motor 32, by means of an endless belt 37 (Figures 5 and 13). Thus, the electric motor 32 drives the gear reduction unit 34 which, in turn, drives a drive shaft 40. One end of shaft 40 is journaled in the housing of the gear reduction unit 34 and its other end is journaled in a bearing block 41 suitably supported on platform 31.

The drive shaft 40 rotates continuously during operation of the machine and transmits step-by-step rotation to the turret 20. To this end, the drive shaft 40 has a crank 45 on its forward end (Figures 5, 7 and 13) and a cam wheel 46 fixed on a medial portion thereof. The crank 45 has the lower end of a pawl-carrying arm or link 47 pivotally connected thereto which extends upwardly at an angle and has a pawl or projection 50 in its bifurcated upper end which rests against the periphery of a ratchet wheel 51. The ratchet wheel 51 is fixed on the rear portion of the turret shaft 23 and the upper wall of housing 29 is suitably slotted, as at 52 (Figures 7 and 10), to accommodate the link 47 and the ratchet wheel 51. The length of stroke of the link 47 is such that it, with the ratchet wheel 51, imparts one-eighth of a revolution to the turret 20 with each active or downward stroke thereof, since there are eight equally spaced boarding forms or blades 55 fixed to and extending forwardly from the periphery of the wheel or turret 20 or, in other words, each of the arms 21 has one of the boarding forms 55 fixed thereto.

Each of the boarding forms 55 is made from a thin rigid material, preferably steel, and is in the shape in which it is desired that the socks be boarded, in that each boarding form 55 includes an elongated base or shank 56, a reduced welt portion 57, an elongated body portion 60 and a rounded free end or toe portion 61. A medial portion of the body 60 is provided with a rounded heel forming projection 62. It will be noted that the boarding forms 55 extend outwardly in substantially parallel relation to the turret shaft 23.

Now, in order to lock the wheel 20 against rotation in the interim between active strokes of the link 47, the rear portion of the turret shaft 23 has a locking wheel or disc 65 fixed thereon which is provided with a plurality of spaced notches 66 in the periphery thereof which are adapted to be engaged by a latch 67 fixed on the free end of a lever 70. The lever 70 is oscillatably mounted on a pair of brackets 71 depending from the upper wall of the housing 29. The lever 70 extends downwardly at an angle and has a follower 72 thereon, shown in the form of a plate, which rests against the periphery of the cam wheel 46.

During each active stroke of the pawl 50 and link 47, the high portion of the cam wheel 46 engages the follower 72 and maintains the latch 67 out of engagement with the locking disc 65. Conversely, during each inactive stroke of the pawl 50, the low portion of cam wheel 46 engages the follower 72 and, since the portion of lever 70 to the left of the brackets 71 is of greater weight than the portion thereof disposed to the right of the brackets 71 in Figure 6, it is apparent that the latch 67 will engage a corresponding notch 66 in the locking disc 65 to prevent rotation of the turret wheel 20.

In the interim between each successive step in rotation of the wheel 20, one operator at a sock donning position or loading station A, at the right of the machine in Figure 1 or near the observer in Figure 5, places one sock on a corresponding boarding form 55. Thereafter, as the latter boarding form 55 with a sock thereon moves downwardly, with movement of the wheel 20 in a clockwise direction in Figure 1, it passes between a pair of heat-radiating devices which are shown in the form of electrically heated platens 73, 74, these heat-radiating devices 73, 74 occupying a position at approximately forty-five degrees relative to the shaft 23 and at the right-hand side of the machine; that is, occupying a position approximately midway between the station A at which the hose is placed on the corresponding boarding form 55 and a transfer-applying station generally designated at 75. The transfer-applying station 75 will be later described.

A second pair of heat-radiating devices or platens 73', 74' are also provided to the left of the vertical plane of the shaft 23 in substantially the same horizontal plane as the pair of heat-radiating devices 73, 74. The heat-radiating devices 73, 74 and 73', 74' and the transfer station 75 are so located that a sock 10 previously positioned on a blade 55 dwells between each pair of the heat-radiating devices, and is "heat-set" thereby, while another sock 11 on a corresponding blade 55 dwells at the transfer station 75, and while an operator is placing another sock on the blade 55 then positioned at donning station A. The transfer-applying mechanism 75 transfers indicia, such as a trade name, stocking size, etc., onto socks positioned on corresponding boarding forms 55 in the interim between alternate successive movements of the turret 20 so the indicia appears on alternate socks, in a manner to be later described.

The heat from the platens 73, 74 initially heat-sets the fabric prior to the transfer-applying operation and, in a succeeding movement of the wheel 20 following movement of the corresponding boarding form 55 past the transfer-applying station 75, the heat-radiating platens 73', 74' further heat-set the fabric and also set the transfers applied to alternate socks. Thus, as alternate socks on corresponding alternate boarding forms 55 reach a doffing station indicated at B in Figures 1 and 9, opposite from the station A at which the first operator places socks on the boarding forms 55, a second operator takes an insert 11 from a table 76 and slides it along the shank 56 of the corresponding boarding form 55, and into the open end of the corresponding sock, until it is positioned therein substantially as shown in Figure 4. Then the second operator continues to move the corresponding insert 11 to move its sock 10 off the free end of the corresponding boarding form 55.

Thereafter, and following the next succeeding step of the wheel 20; that is, upon the completion of each intervening movement of the wheel 20, the operator at station B inserts each sock, into which an insert was previously inserted, into the sock which has been marked with indicia at the station 75 while removing the corresponding marked sock off the corresponding form 55. Thus, the operations heretofore described are repeated to form completed stacks of paired hose with inserts therein which may be positioned on the platform 76 for subsequent delivery to the shipping room.

The rear end of the table or platform 76 is suitably secured to an angle bracket 77 fixed to the front wall of housing 29 and the front end of the platform 76 is fixed to the upper horizontal portion of an inverted substantially L-shaped frame member 78. The frame member 78 is maintained in rigid relation to the front end frame member 28 by means of a diagonal brace 79 and a horizontally disposed intermediate frame member 80 (Figures 1, 5 and 9). The front end of the frame member 80 is suitably secured to a medial portion of the inverted L-shaped frame member 78 and its rear end is suitably secured to the front wall of housing 29.

It will be observed in Figures 1 and 9 that the frame 27 also includes a plurality of substantially horizontal disposed frame members 82 to 85, inclusive, whose rear ends are connected to the housing 29. The forward ends of frame members 82, 83, 84 are connected to the inverted substantially U-shaped front frame member 28. The front end of the horizontally disposed frame member 85 is suitably secured to a post 86 whose upper end has the lower end of an angularly disposed frame member 87 suitably secured thereto. A frame member 90 similar to member 87, is provided at the left-hand side of the machine in Figure 1. The lower end of frame member 90 is suitably secured to an upper portion of the frame member 79 and the frame members 87, 90 extend upwardly in converging relation and are suitably secured to opposite sides of the front-end frame member 28, adjacent its upper end.

A diagonal frame member 91, similar to frame member 79, is provided at the right-hand side of the machine, its upper end being fixed to frame member 87 at its juncture with the post 86. The converging frame members 87 and 90 are provided for supporting the heated platens 73, 74 and 73', 74', respectively. Since the heated platens 73', 74', are substantially the same as the platens 73, 74, the manner in which the platens 73', 74' are constructed and supported will be described and like parts will bear the same reference characters with the prime notation added.

The heated platens 73', 74 are suitably secured to the proximal faces of elongated substantially rectangular housings 95, 96 which contain respective heating elements 97, 98 (Figures 11, 12 and 13) and which also contain suitable heat insulating material 100, 101 for insulating the distal surfaces of the housings 95, 96. The forward ends of the housings 95, 96 have respective relatively small extensions 102, 103 thereon which are supported so as to be adjusted longitudinally of the corresponding angularly disposed frame member 87. To this end, the outer ends of the extensions 102, 103 of the respective housings 95, 96 have the legs of substantially U-shaped brackets 105, 106 suitably secured thereto and encompassing the corresponding angularly disposed frame member 87. The outer or forward ends of the bracket members 105, 106 have oppositely threaded opposite ends of an adjusting rod or shaft 107 threaded therethrough, whose medial portion has a hand-wheel 110 fixed thereon whose periphery is preferably knurled as shown in Figure 11. In order to prevent axial movement of the threaded shaft or rod 107 while adjusting the displacement between the heated platens 73, 74, opposite sides of the hand-wheel 110 engage a pair of supports or projections 111 which are suitably secured to, or formed integral with, the angularly disposed frame member 87. The means for supplying current to the heating elements 97, 98 and 97', 98' will be later described (Figure 13).

*Transfer-applying station*

As heretofore stated, as each alternate boarding form 55 reaches lowermost position on the turret 20, a decalcomania or transfer is applied to the corresponding sock thereon. Each transfer is applied by means of a heated iron or block 115 momentarily moving upwardly from a position below the then lowermost boarding form 55 and pressing a paper strip 116, having heat-transferable decalcomanias thereon, against the lower surface of the sock then positioned on the lowermost boarding form 55. Accordingly, a wheel or roller 120 is provided whose lower surface is engaged by the upper surface of the toe of each successive stocking or sock positioned on a corresponding boarding form 55 so as to maintain the boarding form 55 rigid during the transfer-applying operation, since the boarding forms 55 are made from a relatively thin material. It will be observed in Figures 1, 2 and 9 that the roller 120 is journaled on a stub shaft 121 carried by a built-up inverted substantially L-shaped bracket 122 which is fixed to and projects rearwardly from a cross frame member 123 (Figures 1 and 2) fixed between the legs of the inverted substantially U-shaped front-end frame member 28 heretofore described.

Referring to Figures 1 and 9, the tape or strip 116 is drawn from a roll 126 loosely mounted on a shaft 127 which is loosely mounted in the front wall of the housing 29 and the diagonal brace 91. The tape 116 extends from the roll 126 over a stationary guide rod 130 fixed to the front wall of the housing 29 and to the right-hand leg of the inverted U-shaped frame member 28. The tape passes beneath the path of travel of the boarding forms or blades 55 and the roller 120 and thence in engagement with a guide member 131 carried by the block or iron 115 and projecting upwardly above the level of the block 115 so as to insure that the tape 116 tightly engages the lower surface of the corresponding sock with upward movement of the block 115. From the guide 131, the tape 116 extends to a take-up means including an intermittently driven bottom roll 133 and a pressure idler roll 134, both of the latter rolls and the roll 120 preferably being covered with a resilient material, such as rubber, leather, or the like.

The strip 116 passes between the take-up rolls 133, 134 and may then be taken up by any suitable means. In this instance, a suitable container 138 is provided into which the tape falls, by gravity, as it passes from between the take-up rolls 133, 134. The lower take-up roll 133 is journaled in a pair of forwardly and rearwardly spaced plates 135, 136 (Figures 1, 5 and 9) suitably secured to the horizontally disposed frame members 80, 82 and 83. A bar 137 spans the distance between the plates 135, 136 and is suitably secured thereto below the bottom take-up roll 133. Bar 137 has an upright bar 140 fixed thereto in which the bottom roll 133 is also journaled. The upper edges of the plate 136 and the bar 140 each has a notch 141 therein for loosely receiving reduced opposite ends of the top roll 134 so the top roll 134 rests against the paper or tape 116 and presses the same against the bottom roll 133.

Referring to Figures 1 and 5, the forward reduced end of the bottom roll 133, or the shaft thereof, has a pinion or gear 143 fixed thereon which meshes with a gear 144 rotatably mounted on a stub shaft 145 fixed to and projecting forwardly from the plate 135. The stub shaft 145 also has a pulley 146 loosely mounted thereon which is suitably secured to or formed integral with the gear 144 and is engaged by an endless belt 147. The endless belt 147 extends upwardly and is mounted on a pulley 150 fixed on the shaft 23 to which the form wheel or turret 20 is secured.

It is thus seen that, each time a step in rotation is imparted to the form wheel 20, a step in rotation is imparted to the take-up rolls 133, 134 to advance the tape 116 a predetermined distance.

Now, in the interim between alternate steps in movement of the form wheel 20, the heated iron or transfer block 115 automatically moves upwardly as heretofore described. To this end, the block 115 is fixed on the upper end of a rod 152 which extends downwardly and is connected to an electro-magnetic device including a solenoid plunger 153 which extends through a solenoid coil 154. The solenoid coil 154 is fixed to and depends from a plate 155 which is fixed to and spans the distance between the horizontally disposed frame members 83, 84.

The means for actuating the transfer iron or block 115 will now be described in conjunction with the wiring diagram shown in Figure 13. The circuit includes a pair of lead conductors 160, 161 which lead from a suitable means for connecting the same to a source of current, such as a plug 162. The lead conductor 161 has a suitable, manually operable master switch 163 interposed therein and the two lead conductors 160, 161 extend into a switch housing or a main switch assembly 164 which may be conveniently positioned adjacent the machine. The switch assembly 164 includes four switches, a, b, c and d for establishing contact between the lead conductor 161 and respective conductors 165 to 168, inclusive. The conductor 165 is connected to a pair of manually operable voltage regulators or rheostats 172, 173, to the moving parts of which respective conductors 174, 175 are connected.

The ends of the conductors 174, 175 remote from the rheostats 172, 173 are connected to corresponding ends of the respective heating elements 98, 97'. The ends of the heating elements 98, 97', remote from the ends to which the conductors 174, 175 are connected, are connected to corresponding ends of the heating elements 97, 98' by respective conductors 176, 177. The end of heating element 97, opposite from the end to which conductor 176 is connected, has a conductor 180 connected thereto which leads to the lead wire 160. The end of the heating element 98', remote from the end to which conductor 177 is connected, has a conductor 181 leading therefrom to a medial portion of the conductor 180. It is thus seen that the switch a, when closed, completes the circuit to the heating elements 97, 98, 97' and 98' and the heat output of these heating elements may be predetermined by the rheostats 172, 173.

The switch b controls the flow of current to the electric motor since, when closed, the switch b causes current to flow from lead wire 161, through switch b, through conductor 166 to the electric motor 32. Current flows from the electric motor 32 through a conductor 182 which leads to the lead wire 160.

Figure 10:
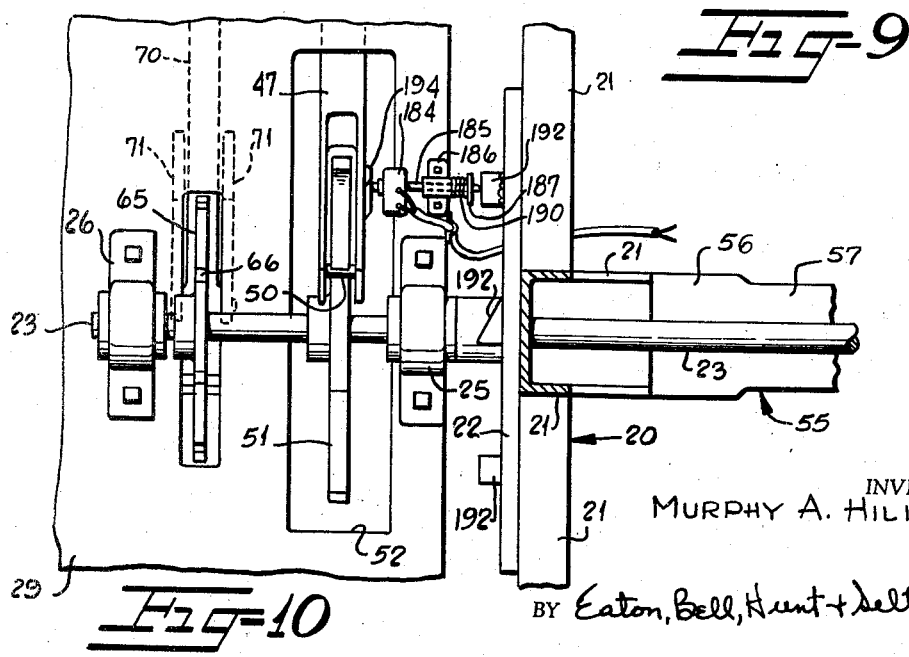
Figure 10 is an enlarged sectional plan view with parts broken away taken substantially along line 10—10 in Figure 5.

The conductor 167, leading from the switch c, is connected to one side of a normally open push-button switch 184 which, as best shown in Figure 10, is fixed on the rear end of a plunger or rod 185 guided forward and rearward in movement in a guide block 186 suitably secured to the upper wall of the housing 29. The forward portion of the plunger 185 has a stop or collar 187 fixed thereon which is engaged by the outer end of a compression spring 190 surrounding the plunger 185. The rear end of spring 190 bears against the guide block 186 and, thus, normally urges the switch 184 and plunger 185 from left to right in Figure 10.

Referring to Figures 5, 8 and 10, it will be observed that the plate 22 of the turret 20 is provided with a plurality of circularly-spaced projections or cams 192 thereon, there being one of these projections 192 for every other one of the blades or boarding forms 55 so that, with alternate movements of the form wheel 20, one of the cams 192 engages and moves the plunger 185 from right to left or rearwardly in Figure 10. In so doing, the switch 184 is positioned in the path of a cam or projection 194 suitably secured to or formed integral with one side of the link or pawl-carrying arm 47 (Figures 5, 7, 10 and 13). The cam 194 on link 47 is so positioned that it moves into the horizontal plane of the switch 184 with each upward stroke of the link 47 and it follows, therefore, that the cam 194 will engage and close switch 184 with alternate upward movements thereof.

Now, referring again to Figure 13, it will be observed that the side of the switch 184 opposite from the side to which conductor 167 is connected has a conductor 200 leading therefrom to one end of the solenoid coil 154 at the transfer-applying station 75. The other end of the coil 154 has a conductor 201 leading therefrom to the lead conductor 160. It is thus seen that, each time the switch 184 is closed in the manner heretofore described, the coil 154 is energized to cause the transfer block or iron 115 to move upwardly and transfer indicia from the tape 116 to the stocking or sock then on the lowermost of the boarding forms 55.

The transfer iron or block 115 contains a relatively small heating element 203 to opposite ends of which the conductor 163 and a conductor 204 are connected, the end of the conductor 204 remote from the heating element 203 being connected to the lead conductor 160.

It is thus seen that I have provided an improved hosiery boarding and form-inserting apparatus wherein one operator may position a sock on each successive boarding form 55 in the interim between successive rotary movements of the wheel 20, while the corresponding boarding form occupies the position A. Each successive sock then passes between the heated platens 73, 74 to board the same. It should also be noted that, with each movement of the wheel 20, the tape 116 is moved a predetermined distance past the heated iron 115 and, upon the termination of each alternate movement of the wheel 20, the switch 184 is closed to energize the coil 154 and raise the heated iron or transfer block 115 into engagement with the lower surface of the stocking or sock then on the lowermost of the boarding forms 55 at the transfer station 75. Thereafter, each successive sock passes between the second set of heated platens 73', 74' to further set the fabric and to also set the transfers applied thereto at the transfer-applying station 75 and, as each successive unmarked sock approaches the station B, an insert 11 may be positioned therein and the sock with the insert is moved off the corresponding boarding form. As the next succeeding marked sock moves to position B, then the sock previously removed from the preceding boarding form 55, with the insert 11 therein, may be slid into the marked sock and the marked sock subsequently slid off of the corresponding form 55 to form a pair of socks positioned on an insert. It is apparent that this greatly facilitates the positioning of inserts in pairs of socks and results in a considerable saving to the manufacturer in time, storage space and labor.

In the drawings and specification there has been set forth a preferred embodiment of the invention and, although specific terms are employed, they are used in a generic and descriptive sense only and not for purposes of limitation, the scope of the invention being defined in the claims.

I claim:

1. Apparatus for boarding socks comprising a turret mounted on a substantially horizontal axis, a plurality of circularly spaced boarding blades projecting outwardly from said turret in substantially parallel relation to the axis of the turret, each of said blades being of the configuration desired of the boarded socks, means to impart step-by-step rotation to the turret wherein each step is substantially equal to the distance between the centers of adjacent blades, whereby a sock may be manually positioned on each successive blade as it occupies a position to one side of the axis of the turret, a pair of spaced substantially parallel heat-radiating elements so positioned that each successive blade moves to a position therebetween with corresponding movements of said turret for heat-setting the sock thereon, a transfer-applying station disposed subsequent to said heat-radiating elements, and means automatically operable in the interim between certain steps in rotation of said turret for automatically applying indicia to a sock on a corresponding blade at said transfer-applying station.

2. Hosiery boarding and marking apparatus comprising a rotatable turret mounted on a substantially horizontal axis and having a series of circularly spaced forms projecting therefrom in substantially parallel relation to its axis, serially arranged heat-setting means and transfer-applying means disposed in the path of travel of said forms, means to impart step-by-step rotation to said turret in such a manner that one of said forms is positioned at said heat-setting means and another is positioned at said transfer-applying means in the interim between each successive step in movement of said turret, said heat-setting means comprising a pair of radially spaced substantially parallel heat-radiating elements positioned astride the path of travel of said forms, said transfer-applying means comprising means for advancing a tape having transfers thereon adjacent the path of travel of the outer surfaces of said forms with each step in rotation of said turret, a heated block disposed outwardly of said tape, and means automatically operable in the interim between certain steps in rotation of said turret for moving said heated block against said tape and pressing the same against the outer surface of a sock on a corresponding form.

3. A structure according to claim 2 wherein said means for moving said heated block comprises an electromagnetic device to which said block is connected, a switch interposed in an electrical circuit to said device, and means under control of the means to impart step-by-step rotation to said turret for actuating said switch in the interim between certain successive steps in movement of said turret.

4. A structure according to claim 2 wherein said means for moving said heated block comprises a solenoid plunger to which said block is attached, a solenoid coil surrounding said plunger, a switch interposed in an electrical circuit to said coil, and means under control of the means to impart step-by-step rotation to said turret for closing said switch in the interim between certain successive steps in movement of said turret.

5. A structure according to claim 2 wherein said means for advancing said tape comprises a pair of take-up rolls between which the tape is drawn from a source, said source being positioned adjacent one side of said heated block, said take-up rolls being positioned adjacent the opposite side of said heated block, and a driving connection between the turret and the take-up rolls whereby, upon a step in rotation being imparted to said turret, a step in rotation is imparted to said rolls for drawing a predetermined length of tape past the heated block.

6. A structure according to claim 3 wherein said means for imparting step-by-step rotation to said turret comprises a ratchet wheel fixed in co-axial relation with said turret, a reciprocating pawl for engaging said ratchet wheel and imparting a step in rotation thereto with each active stroke of the pawl, a switch actuating cam movable with said pawl, means movably supporting said switch, means resiliently maintaining said switch out of the path of travel of the switch actuating cam and means movable with said turret for moving said switch into the path of travel of said switch actuating cam in the course of certain steps in rotation of said turret whereby said switch actuating cam then engages and actuates said switch.

7. An improved hosiery boarding and marking apparatus comprising a turret mounted for rotation on a substantially horizontal axis, a series of circularly spaced relatively thin blades carried by said turret and extending substantially horizontally in a common direction from said turret, means for imparting step-by-step rotation to said turret for successively positioning each blade at a predetermined location in substantially horizontal relationship to the axis of the turret, each of said blades being shaped according to the desired shape of the boarded hose, whereby a hose may be positioned on each successive blade as it occupies the latter position, spaced first and second sets of heat-radiating elements disposed in the path of travel of each successive blade and being so arranged that one of said blades dwells at each of said sets of heat-radiating elements in the interim between each successive step in rotation of said turret for heat-setting the socks positioned on the corresponding blades, a transfer-applying station disposed between the two sets of heat-radiating elements and also being positioned at a point at which a corresponding blade dwells in the interim between each successive step in rotation of said turret, said transfer-applying station comprising means for advancing a tape having transfers thereon past the circular plane of travel of said blades with each successive step in movement of said turret, a heated block disposed outwardly of said tape, and means automatically operable following each of alternate steps in rotation of said turret for moving said heated block against the tape and pressing the same against a sock on the corresponding blade for transferring indicia from said tape to said corresponding sock.

8. A structure according to claim 7 wherein said means for moving said heated block comprises a solenoid plunger to which said block is attached, a solenoid coil surrounding said plunger, a normally inactive switch interposed in an electrical circuit to said coil, and means under control of the means for imparting step-by-step rotation to said turret for momentarily actuating said switch in the interim between alternate steps in movement of said turret.

9. A structure according to claim 7 wherein said means for advancing said tape comprises a pair of take-up rolls between which the tape is drawn from a source, said source being positioned adjacent one side of said block, said take-up rolls being positioned adjacent the opposite side of said block, and a driving connection between the turret and the take-up rolls whereby, upon a step in rotation being imparted to said turret, a step in rotation is imparted to said rolls for drawing a predetermined length of tape past the heated block.

10. A structure according to claim 7 wherein said means for imparting step-by-step rotation to said turret comprises a ratchet wheel fixed in co-axial relation with said turret, a reciprocating pawl for engaging said ratchet wheel and imparting a step in rotation thereto with each active stroke of the pawl, a switch actuating cam movable with said pawl, means movably supporting said switch, means resiliently maintaining said switch out of the path of travel of the switch actuating cam, and means movable with said turret for moving said switch into the path of travel of said switch actuating cam in the course of alternate steps in rotation of said turret whereby said switch actuating cam then engages and actuates said switch.

11. Apparatus for boarding socks comprising a rotatable turret, a plurality of circularly spaced boarding blades projecting outwardly from said turret in substantially parallel relation to the axis of the turret, each of said blades being of the configuration desired of the boarded socks, means to impart step-by-step rotation to the turret wherein each step is substantially equal to the distance between the centers of adjacent blades, whereby a sock may be manually positioned on each successive blade as it occupies a position to one side of the axis of the turret, a pair of spaced substantially parallel heat-radiating elements so positioned that each successive blade moves to a position therebetween with corresponding movements of said turret for heat-setting the sock thereon, a transfer-applying station disposed subsequent to said heat-radiating elements, and means automatically operable in the interim between certain steps in rotation of said turret for automatically applying indicia to a sock on a corresponding blade at said transfer-applying station.

12. Hosiery boarding and marking apparatus comprising a rotatable turret having a series of circularly spaced forms projecting therefrom in substantially parallel relation to its axis, a serially arranged heat-setting means and transfer-applying means disposed in the path of travel of said forms, means to impart step-by-step rotation to said turret in such a manner that one of said forms is positioned at said heat-setting means and another is positioned at said transfer-applying means in the interim between each successive step in movement of said turret, said heat-setting means compressing a pair of radially spaced substantially parallel heat-radiating elements positioned astride the path of travel of said forms, said transfer-applying means comprising means for advancing a tape having transfers thereon adjacent the path of travel of the outer surfaces of said forms with each step in rotation of said turret, a heated block disposed outwardly of said tape, and means automatically operable in the interim between alternate steps in rotation of said turret for moving said heated block against said tape and pressing the same against the outer surface of a sock on a corresponding form.

13. A structure according to claim 12 wherein said means for advancing said tape comprises a pair of take-up rolls between which the tape is drawn from a source, said source being positioned adjacent one side of said heated block means and said take-up rolls being positioned adjacent the opposite side of said heated block, and a driving connection between the turret and the take-up rolls whereby, upon a step in rotation being imparted to said turret, a step in rotation is imparted to said rolls for drawing a predetermined length of tape past the heated block.

14. An improved hosiery boarding and marking apparatus comprising a rotatable turret, a series of circularly spaced relatively thin blades carried by said turret and extending substantially parallel to the axis of the turret and in a common direction from said turret, means to impart step-by-step rotation to said turret for successively positioning each blade at a predetermined location to one side of the turret, each of said blades being shaped according to the desired shape of the boarded hose, whereby a hose may be positioned on each successive blade at the latter position, spaced first and second sets of heat-radiating elements disposed in the path of travel of each successive blade and being so arranged that one of said blades dwells at each of said sets of heat-radiating elements in the interim between each successive step in rotation of said turret for heat-setting the hose positioned on the corresponding blades, a transfer-applying station disposed between the two sets of heat-radiating elements and also being positioned at the point at which a corresponding blade dwells in the interim between each successive step in rotation of said turret, said transfer-applying station comprising means for advancing a strip having transfers thereon past the circular plane of travel of said blades with each successive step in movement of said turret, a heated block disposed outwardly of said tape, and means automatically operable following each alternate step in rotation of said turret for moving said heated block against the tape and pressing the same against a hose on the corresponding blade for transferring indicia from said tape to said corresponding hose, and a roller engageable by each successive blade as it moves to said transfer-applying means for engaging the inner surface of the hose on the latter blade to maintain the blade rigid during the transfer-applying operation.

References Cited in the file of this patent

UNITED STATES PATENTS

| | | |
|---|---|---|
| 1,657,552 | Schremp | Jan. 31, 1928 |
| 2,286,458 | Bowman et al. | June 16, 1942 |
| 2,745,191 | Southerland | May 15, 1956 |